United States Patent
Pirzada et al.

(10) Patent No.: US 8,793,308 B2
(45) Date of Patent: Jul. 29, 2014

(54) SYSTEMS AND METHODS FOR MANAGING STORAGE FOR CLIENT WORKLOADS

(75) Inventors: Fahd Pirzada, Austin, TX (US); Stephen Luning, Austin, TX (US)

(73) Assignee: Dell Products L.P., Round Rock, TX (US)

(*) Notice: Subject to any disclaimer, the term of this patent is extended or adjusted under 35 U.S.C. 154(b) by 864 days.

(21) Appl. No.: 12/773,509

(22) Filed: May 4, 2010

(65) Prior Publication Data
US 2011/0276620 A1    Nov. 10, 2011

(51) Int. Cl.
 G06F 15/16 (2006.01)
 G06F 13/00 (2006.01)
 G06F 12/16 (2006.01)
 G06F 15/167 (2006.01)
 G06F 12/00 (2006.01)

(52) U.S. Cl.
 USPC ........... 709/203; 709/205; 709/220; 709/225; 711/112; 711/114; 711/162

(58) Field of Classification Search
 USPC .......... 709/206, 208, 214, 220; 711/162, 163, 711/114, 147
 See application file for complete search history.

(56) References Cited

U.S. PATENT DOCUMENTS

| | | | | |
|---|---|---|---|---|
| 2003/0140107 | A1* | 7/2003 | Rezvani et al. | 709/208 |
| 2007/0061515 | A1* | 3/2007 | Kano | 711/114 |
| 2007/0204115 | A1* | 8/2007 | Abramson | 711/154 |
| 2008/0001713 | A1* | 1/2008 | Dasgupta et al. | 340/10.1 |
| 2008/0244196 | A1* | 10/2008 | Shitomi et al. | 711/147 |
| 2009/0198805 | A1* | 8/2009 | Ben-Shaul et al. | 709/222 |
| 2011/0131330 | A1* | 6/2011 | Beaty et al. | 709/227 |

OTHER PUBLICATIONS http://docs.oracle.com/cd/E19186-01/875-4622-10/875-4622-10.pdf "Veritas Volume Manager Administrator's Guide"—Oct. 2008 Solaris.*
http://www.oracle.com/us/products/servers-storage/solaris/solaris-zfs-ds-067320.pdf "Oracle Solaris ZFS"—Oracle Solaris, Apr. 2007.*
Rich, ZFS, Sun's Cutting-Edge File System (Part 1: Storage Integrity, Security, and Scalability), BigAdmin System Administration Portal, Aug. 2006, available at http://www.sun.com/bigadmin/features/articles/zfs_part1.scalable.jsp.
Rich, ZFS, Sun's Cutting-Edge File System (Part 2: Ease of Administration and Future Enhancements), BigAdmin System Administration Portal, Aug. 2006, available at http://www.sun.com/bigadmin/features/articles/zfs_part2_ease.jsp.
Ninov, Quick Overview of Veritas filesystem (VxFS), Jul. 2008, available at http://it.toolbox.com/wiki/index.php/Quick_overview_of_Veritas_filesystem_(VxFS).

* cited by examiner

Primary Examiner — Randy Scott
(74) Attorney, Agent, or Firm — Baker Botts L.L.P.

(57) ABSTRACT

A method for managing the storage of a client workload is disclosed. A storage management system is provided. The storage management system is operable to communicatively connect to a remote client computing device via a network. The storage management system includes a block-based storage medium, a file-based storage medium, and an object-based storage medium. A virtual image, which is associated with a remote client computing device, is stored. Elements of the virtual image are allocated across one or more of the block-based storage medium, the file-based storage medium, and the object-based storage medium, where the allocation depends on a characterization of the elements.

17 Claims, 2 Drawing Sheets

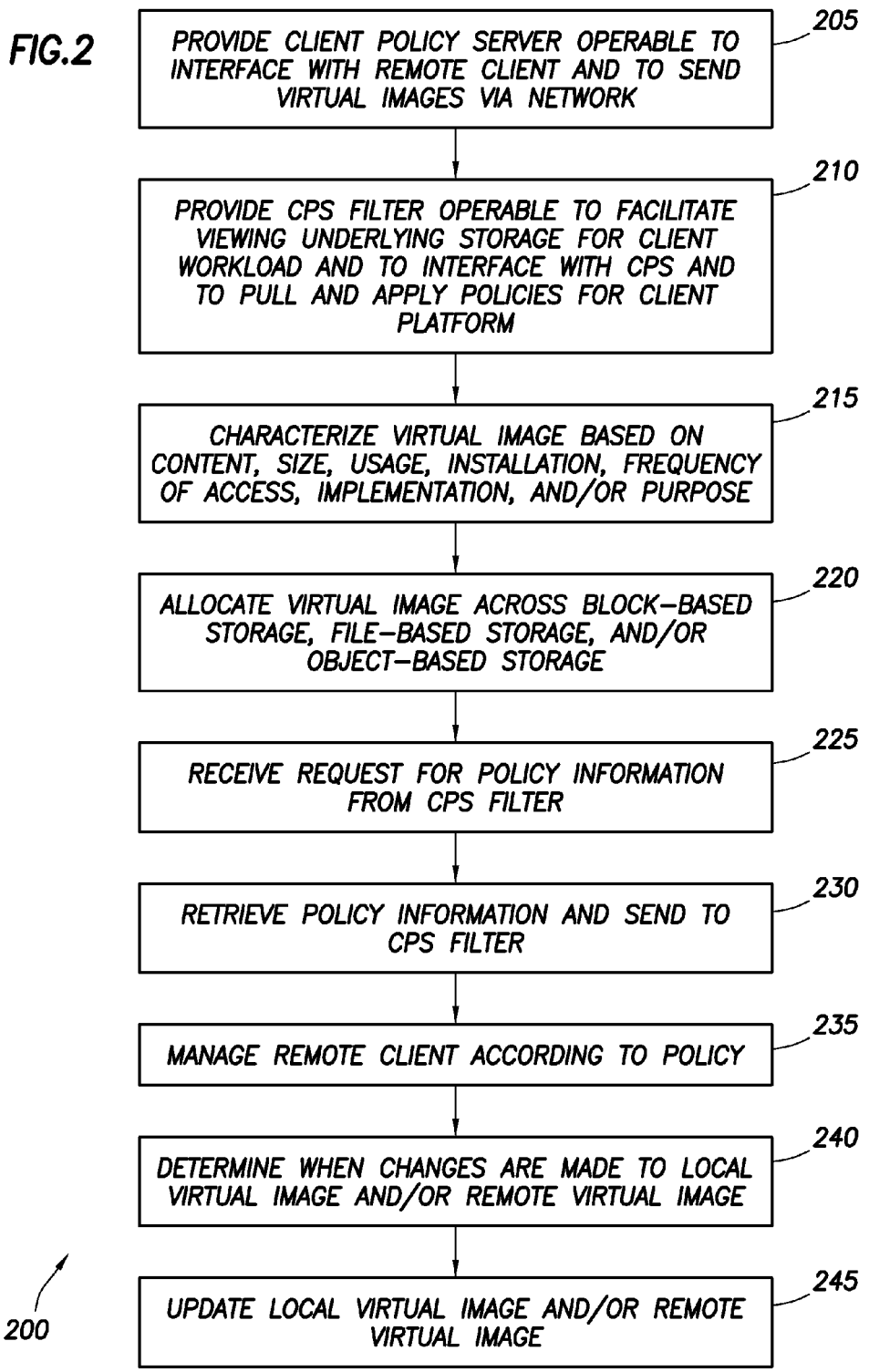

SYSTEMS AND METHODS FOR MANAGING STORAGE FOR CLIENT WORKLOADS

TECHNICAL FIELD

The present disclosure relates generally to information handling systems and, more particularly, to systems and methods for managing storage for client workloads.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may be configured for operation based on a virtualization model. Virtualization may be a computer networking model where a set of information handling systems may be configured as host servers for access by a set of remote clients. The set of information handling systems may be included within a data center. Often, the number of servers is small relative to the number of remote clients that the host servers are capable of hosting.

With desktop virtualization, one or more servers may host a remote client user desktop environment and applications via a client-server model. The benefits of virtualization may include improved manageability and security of end user computing, for example, by migrating client workloads to a data center. Such migration of client workloads places demanding requirements on the storage back-end. One difficulty to be considered is scalability, as the storage back-end may host thousands of user sessions as in the case of a Storage Area Network (SAN), for example. Another difficulty is impact on performance, as the storage back-end may support bursty client workloads, for example. Yet another difficulty is latency in application responsiveness as compared to client platforms. Such demanding requirements hamper performance and capacity of systems employing virtualization. Accordingly, it is desirable to provide systems and methods for managing storage for client workloads in order to unify and optimize storage management.

SUMMARY

The present disclosure relates generally to information handling systems and, more particularly, to systems and methods for managing storage for client workloads.

In one aspect, an architecture for a storage management system is disclosed. The architecture includes a data center that is operable to communicatively connect to a remote client computing device via a network. The data center includes a storage management system. The storage management system includes a virtual image at the data center that is associated the remote client computing device. The storage management system further includes a block-based storage medium, a file-based storage medium, and an object-based storage medium. The storage management system is operable to allocate elements of the virtual image across one or more of the block-based storage medium, the file-based storage medium, and the object-based storage medium, where the allocation depends on a characterization of the elements performed by the storage management system.

In another aspect, a computer-readable storage medium for a storage management system comprising a virtual image at the data center that is associated a remote client computing device, a block-based storage medium, a file-based storage medium, and an object-based storage medium, wherein the computer-readable storage medium comprises executable instructions that, when executed by a processor, cause the processor to: send a virtual image to a remote client computing device via a network; determine when changes are made to the virtual image; and determine when changes are made to a client virtual image at the remote client computing device, where the client virtual image corresponds to the virtual image.

In yet another aspect, a method for managing the storage of a client workload is disclosed. A storage management system is provided. The storage management system is operable to communicatively connect to a remote client computing device via a network. The storage management system includes a block-based storage medium, a file-based storage medium, and an object-based storage medium. A virtual image, which is associated with a remote client computing device, is stored. Elements of the virtual image are allocated across one or more of the block-based storage medium, the file-based storage medium, and the object-based storage medium, where the allocation depends on a characterization of the elements.

Thus, the present disclosure provides systems and methods for managing storage for client workloads. To optimize the storage backend of systems employing virtualization, certain embodiments of the present disclosure provide for tiering and scaling of client workload storage based on performance and/or capacity. Certain embodiments may provide for intelligent storage management to store client workloads so that an end user may achieve better performance and lower capacity utilization. Certain embodiments may provide for unified management of storage with a common platform. Certain embodiments may provide for clean bridging from private cloud networks to public cloud networks. Other technical advantages will be apparent to those of ordinary skill in the art in view of the specification, claims and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIG. 2 illustrates a flow chart of an example method for managing storage for client workloads in a system, in accordance with certain embodiments of the present disclosure.

Figure 1:
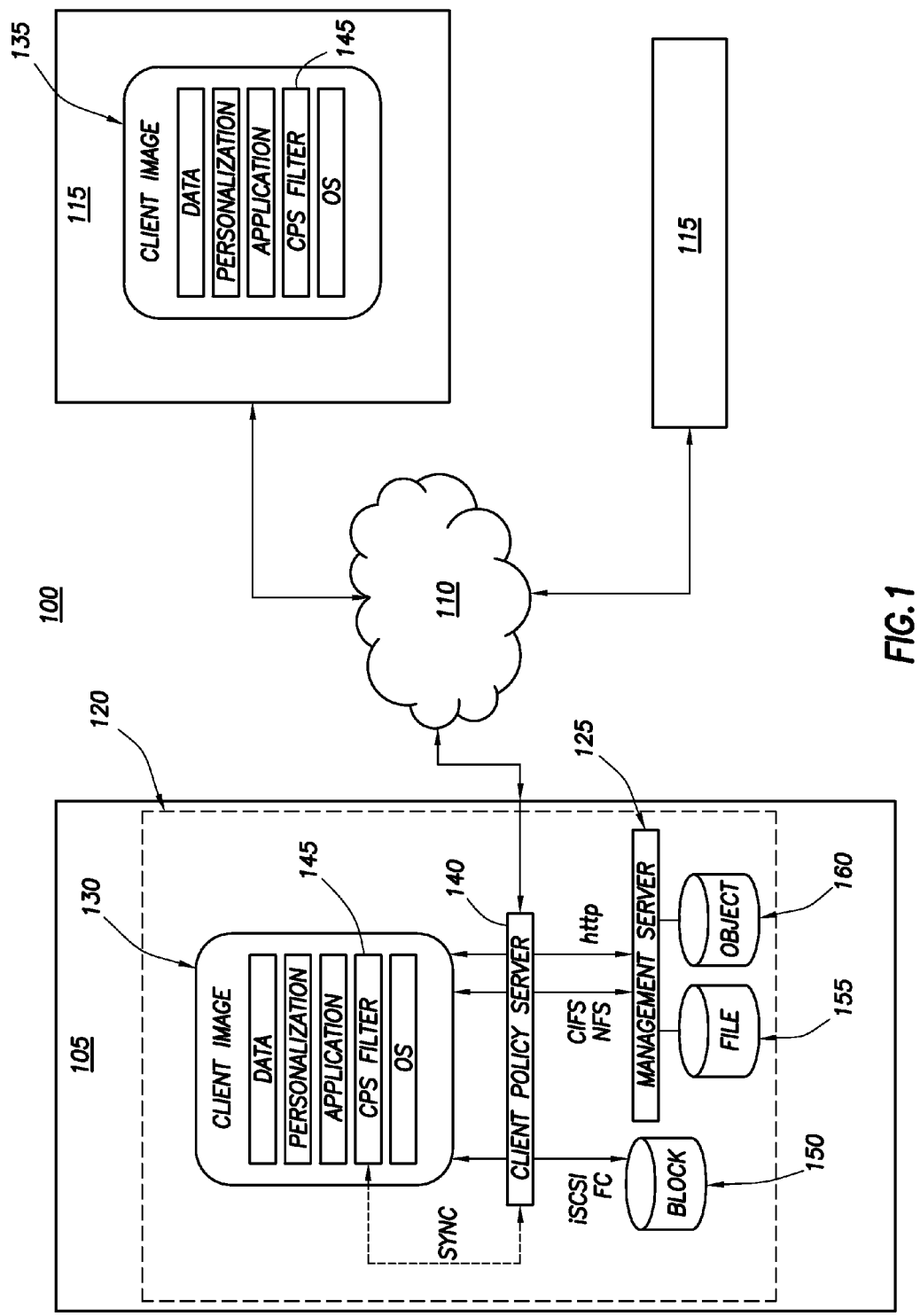
FIG. 1 is a schematic diagram of an architecture for managing storage for client workloads in a system, in accordance with certain embodiments of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable media may include any instrumentality or aggregation of instrumentalities that may retain data and/or instructions for a period of time. Computer-readable media may include, for example without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 is a simplified schematic diagram of an architecture 100 for managing storage for client workloads in a system, in accordance with certain embodiments of the present disclosure. A plurality of information handling systems may be housed in a data center, which is indicated generally at 105. The data center may include several rows of racks of information handling systems. The information handling systems may include computational units, which provide a computational power that may be distributed across several information handling systems.

The data center 105 may be operatively connected to a plurality of remote client computers 115 over one or more networks 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The data center 105 may provide a central location for a storage management system 120 that may include one or more servers for management, hosting, and storage for remote client computers 115. The storage management system 120 may include one or more storage devices that may be any system, device, or apparatus operable to retain program instructions or data for a period of time. The one or more storage devices may include or be an integral part of an array of storage devices such as a RAID storage system. The one or more storage devices may include any combination of hard disk drives, magnetic tape libraries, optical disk drives, magneto-optical disk drives, compact disk drives, compact disk arrays, disk array controllers, solid state drives, and/or any computer-readable medium operable to store data. The storage management system 120 may be configured to support disk mirroring, backup, restoration, archival, archive retrieval, data migration between storage devices, and sharing of data among servers. In certain embodiments, the storage management system 120 may include storage configured as a Storage Area Network (SAN) that interconnects different kinds of data storage devices. The SAN may be part of an overall network of computing resources for an enterprise.

The data center 105 may provide virtual resources for one or more for remote client computers 115. The storage management system 120 may include a management server 125 for managing other servers and/or virtual resources for one or more remote clients 115. The virtual resources may be provided to enable remote availability of programs, applications, processes and data. A desktop virtualization model may allow for the provision of virtual machines or virtual desktops. Thus, by employing virtualization, the client machines 115 may be thin clients so that the need to have their own desktops (operating system and applications) may be eliminated. However, the data center 105 may also provide virtual resources to a variety of information handling systems other than thin clients, including PC workstations, handheld computing devices, wireless communication devices, or any other device capable of accessing and interacting with the data center 105.

In providing virtual machines, virtual desktops or other virtual resources, one or more virtual images may be associated with clients 115. By way of example, the data center 105 may store and maintain a set of virtual client images to support an OS, device drivers, applications, personalization information, configuration data, state data and/or other data for a client. While client images corresponding to a given client may be logically related, the images may be modular such that image components may be stored separately.

FIG. 1 shows a representation of client images associated with a client workload. A client image 130 is depicted as residing at the data center 105 and corresponding to an off-premise client image 135. The client images 130 and 135 may include various corresponding elements, which are generally identified in FIG. 1 as data, personalization information, application, and OS (operating system). It should be understood that the representations of FIG. 1 are simplified for the sake of clarity and explanation. The client images 130 and 135 may further include elements such as identifier information, metadata information, base image elements that may be shared among devices, state information, configuration information, etc. that may be specific to the characteristics of an implementation and remote client, as would be understood by one of ordinary skill in the art having the benefit of this disclosure.

Intelligent storage management may be implemented with a client policy server (CPS) 140 and a CPS filter 145. The storage management system 120 may unify storage management through a common management and instrumentation platform. The application of a unified storage architecture to client workloads may be an open implementation that is not tied to a specific storage array or clustered file system or object store.

The CPS 140 may be deployed as a stand-alone software module or integrated with a connection broker, a backup/recovery server or a profile virtualization server. The CPS 140 may provide synchronization of cached data at the client 115 with centralized data in the data center 105. Access to centralized data in the data center 105 may be enabled with remote access protocols. The CPS 140 may provide synchronization of the CPS filter 145 for on-premise as well as off-premise network-based usage. For example, the CPS 140 may compare metadata information in order to determine if updates to elements of client images 130 and/or 135 are necessary, and then facilitate transfer of updates as needed. The CPS 140 may act as an interface to the configuration and management of the CPS filter 145.

The CPS filter 145 may be deployed as a software agent on the client platform. In certain alternative embodiments, the CPS filter 145 may be deployed at one or both of the storage manage system 120 and the client platform. The implementation of the CPS filter 145 may follow standard ISV (independent software vendor) guidelines. The CPS filter 145 may provide a single-pane view of the underlying storage for client applications. The CPS filter 145 may interface with the CPS 140 backend to pull policies, configuration settings, and/or management settings. Policies and/or settings may be applied to the client platform as a whole, as opposed to management of individual applications that may or may not have policies for different tiers of storage.

The storage management system 120 may utilize CPS 140 and CPD filter 145 to provide network scalability and may accommodate the varied usage of data that changes over time. The storage management system 120 may accommodate client demand that requires varied speeds of access. For example, client requests may be bursty and may be directed to certain portions of stored data with greater frequency than other portions of client data. The storage management system 120 may monitor client requests and characterize data requests in order to control more efficiently how data is stored on underlying storage media.

Client workloads may be tiered for optimized performance. Frequently used elements (e.g., base OS image and applications) may be hosted on a higher performance, lower capacity storage tier. Client workloads may be tiered for optimized capacity. For example, as data ages, it is less frequently used and may be hosted on a lower performance, higher capacity tier. The determination of whether data should be hosted on the lower performance tier may be based on a comparison of the data to other portions of data for a given client, a comparison to data for one or more other clients, and/or a comparison to a predetermined threshold set by an administrator.

In architectures according to embodiments of the present disclosure, client workload storage at the data center 105 may be scaled across block, file and object for various aspects of client workloads. The storage management system 120 may include block-based storage 150, file-based storage 155, and object-based storage 160. In certain embodiments, one or more storage/data servers may be associated with block-based storage 150, file-based storage 155, and object-based storage 160. Client workloads may be deployed as block-based storage. For example, a HDD (hard disk drive) on a client laptop or desktop may be exposed as a LUN (logical unit number) and the OS may provide a file system. Client workloads may be deployed as file-based storage. For example, in a streaming OS implementation, the OS may be treated as a VHD (virtual hard disk) and native boot of platforms from a VHD may be allowed. Network-based client workloads may be deployed as object-based storage. In such implementations, object storage may be a native resource for data center and remote access storage.

The storage management system 120 may employ intelligent storage management to store client workloads so that an end user may achieve better performance and lower capacity utilization. Resources for virtualization may be characterized and partitioned according to a tier system. Accordingly, the components of a virtual image may be stored in and hosted from different tiers.

The CPS 140 may provide a single interface to block-based storage 150, file-based storage 155, and object-based storage 160. The CPS 140 may interface with block-based storage 150, file-based storage 155, and object-based storage 160 via one or more block storage and file/object storage management servers. In one example, the CPS 140 may be coupled directly to block-based storage 150, while being coupled to file-based storage 155 and object-based storage 160 via one or more management servers 125. A connection for the block-based storage 150 may use, for example, iSCSI, Fibre Channel (FC), or any other suitable communication protocol or technology. A connection for the file-based storage 155 may use, for example, CFIS (Common Internet File System), NFS (Network File System), or any other suitable communication protocol or technology. A connection for the object-based storage 160 may use, for example, HTTP (HyperText Transfer Protocol), or any other suitable communication protocol or technology.

An OS for a remote client 115 may be implemented in a variety of ways. An OS may be streamed from the data center 105 to the remote client 115 and, in some implementations, may be shared by more than one remote client 115. An OS may reside in a virtual-machine-based image in the data center 105 and may correspond to one remote client desktop. An OS may be locally hosted on a physical client 115.

Tiering for an OS may be configured in the CPS 140 and enforced through the CPS filter 145. The data and other stored elements associated with an OS may be characterized and stored based on implementation, for example. For streaming, OS elements may be stored in one or more files in file-based storage 155. For a VM-based image, OS elements may be stored in one or more files in file-based storage 155 and/or blocks in block-based storage 150. For local hosting on a physical client, OS elements may be stored in one or more blocks.

Tiering for applications likewise may be configured in the CPS 140 and enforced through the CPS filter 145. The data and other stored elements associated with applications may be characterized and stored based on installation, for example. For applications installed on the data center side by administration and management, application elements may be stored in one or more files in file-based storage 155 and/or blocks in block-based storage 150. For applications installed by a remote user, application elements may be stored in one or more objects in object-based storage 160.

User personalization information and user data also may be stored based on its characterization. For administration policy, elements may be stored in one or more files. For user profiles, elements may be stored in one or more objects in object-based storage 160. Local user data may be stored in one or more files and/or blocks. Network user data may be stored in one or more objects in object-based storage 160.

FIG. 2 illustrates a flow chart of an example method 200 for managing storage for client workloads in a system, in accordance with certain embodiments of the present disclosure. According to one embodiment, method 200 may begin at step 205. Teachings of the present disclosure may be implemented in a variety of configurations of architecture 100. As such, the order of the steps comprising method 200 may depend on the implementation chosen.

At step 205, a client policy server (CPS) may be provided. The CPS may be operable to interface with a remote client computing device and to send one or more virtual images to the remote client computing device via a network. At step 210, a CPS filter may be provided. The CPS filter may be operable to facilitate viewing the underlying storage for a client workload on a display device. The CPS filter may be further operable to interface with the CPS and to pull and apply policies for the client platform.

At step 215, elements of a virtual image may be characterized based on one or more of content, size, usage, installation, frequency of access, implementation, and purpose associated with the elements. At step 220, based on the characterization, elements of the virtual image may be allocated across one or more of block-based storage, file-based storage, and object-based storage. As previously disclosed herein, client workloads also may be tiered for optimized performance and/or optimized capacity. Frequently used elements may be hosted on a higher performance, lower capacity storage tier. Aged data and/or less frequently used data may be hosted on a lower performance, higher capacity tier.

At step 225, a request for policy information from a CPS filter may be received. At step 230, the policy information may be retrieved and sent to the CPS filter. At step 235, the remote client computing device may be managed according to policy determined by the CPS. At step 240, it may be determined when changes are made to one or both of a local virtual image and a corresponding remote virtual image. At step 245, one or both of the local virtual image and the corresponding remote virtual image may be updated.

Accordingly, the present disclosure provides systems and methods for managing storage for client workloads. To optimize the storage backend of systems employing virtualization, certain embodiments of the present disclosure provide for tiering and scaling of client workload storage based on performance and/or capacity. Certain embodiments may provide for intelligent storage management to store client workloads so that an end user may achieve better performance and lower capacity utilization. Certain embodiments may provide for unified management of storage with a common platform. Certain embodiments may provide for clean bridging from private cloud networks to public cloud networks. These and other technical advantages will be apparent to those of ordinary skill in the art in view of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. An architecture for a storage management system, comprising:
   a data center that is operable to communicatively connect to a remote client computing device via a network, wherein the data center comprises a storage management system comprising:
      at least one computer system with at least one processor;
      a virtual image at the data center that is associated with the remote client computing device;
      a non-transitory block-based storage medium;
      a non-transitory file-based storage medium; and
      a non-transitory object-based storage medium;
   one or more resources for virtualization, wherein the resources are characterized and partitioned according to a tier system and wherein elements of the virtual image are stored in and hosted from different tiers;
   wherein the storage management system is operable to allocate elements of the virtual image across one or more of the non-transitory block-based storage medium, the non-transitory file-based storage medium, and the non-transitory object-based storage medium, wherein the allocation depends on a characterization of the elements performed by the storage management system; and
   a client policy server filter, wherein the client policy server filter comprises instructions stored on a computer readable medium that, when executed by a processing unit, provide, on a display device, a view of the allocation of elements of the virtual image, and wherein the client policy server filter provides a view on a display of the allocation of elements of the client virtual image.

2. The architecture for a storage management system according to claim 1, wherein the elements comprise:
   an operating system for the remote computing device;
   an application for the remote computing device;
   user personalization information associated with a user of the remote computing device; and
   user data associated with the user.

3. The architecture for a storage management system according to claim 1, further comprising:
a client policy server that is operable to:
interface with the remote client computing device;
send the virtual image to the remote client computing device via the network;
determine when changes are made to the virtual image; and
determine when changes are made to a client virtual image at the remote client computing device, where the client virtual image corresponds to the virtual image at the data center.

4. The architecture for a storage management system according to claim 3, wherein the client policy server is operable at least to initiate an update of one or both of the virtual image and the client virtual image, in response to a determination that changes were made to one or both of the virtual image and the client virtual image.

5. The architecture for a storage management system according to claim 1, wherein the client policy server filter is operable to provide the view at the remote client computing device.

6. The architecture for a storage management system according to claim 1, wherein the client policy server is operable to manage the client policy server filter.

7. The architecture for a storage management system according to claim 6, wherein the client policy server filter is operable to interface with the client policy server to manage the client computing device according to a policy determined by the client policy server.

8. The architecture for a storage management system according to claim 1, wherein the characterization of the elements is based on one or more of content, usage, installation, frequency of access, implementation and purpose.

9. A non-transitory computer-readable storage medium for a storage management system comprising a virtual image that is associated with a remote client computing device, a non-transitory block-based storage medium, a non-transitory file-based storage medium, and a non-transitory object-based storage medium, wherein the non-transitory computer-readable storage medium comprises executable instructions that, when executed by a processor, cause the processor to:
send a virtual image to the remote client computing device via a network;
characterize and partition one or more resources for virtualization according to a tier system, wherein elements of the virtual image are stored in and hosted from different tiers;
determine when changes are made to the virtual image;
determine when changes are made to a client virtual image at the remote client computing device, where the client virtual image corresponds to the virtual image; and
allocate elements of the client virtual image across one or more of the non-transitory block-based storage medium, the non-transitory file-based storage medium, and the non-transitory object-based storage medium, wherein the allocation depends on a characterization of the elements; and
provide, by a client policy server filter, a view on a display the allocation of elements of the client virtual image.

10. The computer-readable storage medium according to claim 9, wherein the executable instructions further cause the processor to:
initiate an update of one or both of the virtual image and the client virtual image, in response to a determination that changes were made to one or both of the virtual image and the client virtual image.

11. The computer-readable storage medium according to claim 9, wherein the executable instructions further cause the processor to:
characterize elements of the virtual image based on one or more of content, usage, installation, frequency of access, implementation and purpose.

12. The computer-readable storage medium according to claim 9, wherein the elements comprise:
an operating system for the remote computing device;
an application for the remote computing device;
user personalization information associated with a user of the remote computing device; and
user data associated with the user.

13. The computer-readable storage medium according to claim 9, wherein the executable instructions further cause the processor to:
receive a request for policy information from the client policy server filter;
retrieve the policy information; and
send the policy information to the client policy server filter for the management of the remote client computing device.

14. A method for managing the storage of a client workload, the method comprising:
providing a storage management system that is operable to communicatively connect to a remote client computing device via a network, wherein the storage management system comprises:
at least one computer system with at least one processor;
a non-transitory block-based storage medium;
a non-transitory file-based storage medium; and
a non-transitory object-based storage medium;
storing a virtual image that is associated with a remote client computing device;
characterizing and partitioning one or more resources for virtualization according to a tier system, wherein elements of the virtual image are stored in and hosted from different tiers;
allocating elements of the virtual image across one or more of the non-transitory block-based storage medium, the non-transitory file-based storage medium, and the non-transitory object-based storage medium, wherein the allocation depends on a characterization of the elements based, at least in part, on one or more of content, usage, installation, frequency of access, implementation and purpose; and
providing a client policy server filter, wherein the client policy server filter comprises instructions stored on a computer readable medium that, when executed by a processing unit, provide, on a display device, a view of the allocation of elements of the virtual image.

15. The method for managing the storage of a client workload of claim 14, wherein the elements comprise:
an operating system for the remote computing device;
an application for the remote computing device;
user personalization information associated with a user of the remote computing device; and
user data associated with the user.

16. The method for managing the storage of a client workload of claim 14, further comprising:
providing a client policy server that is operable to:
interface with the remote client computing device;
send the virtual image to the remote client computing device via the network;
determine when changes are made to the virtual image; and determine when changes are made to a client virtual image at the remote client computing device, where the client virtual image corresponds to the virtual image at the data center.

17. The method for managing the storage of a client workload of claim 16, wherein the client policy server is operable at least to initiate an update of one or both of the virtual image and the client virtual image, in response to a determination that changes were made to one or both of the virtual image and the client virtual image.

* * * * *